(12) United States Patent
Kim

(10) Patent No.: US 6,331,338 B1
(45) Date of Patent: *Dec. 18, 2001

(54) AMORPHOUS ALLOY OF LIGHT RARE EARTH-TRANSITION METAL AND SEMI-METAL, MAGNETO-OPTICAL RECORDING LAYER MADE OF THE ALLOY, AND MAGNETO-OPTICAL DISK ADOPTING THE LAYER

(75) Inventor: Jai-young Kim, Kunpo (KR)

(73) Assignee: Samsung Electronics Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/738,837

(22) Filed: Oct. 28, 1996

(30) Foreign Application Priority Data

Oct. 28, 1995 (KR) ................................................. 95-37773
Oct. 31, 1995 (KR) ................................................. 95-39037
Oct. 18, 1996 (KR) ................................................. 96-46847

(51) Int. Cl.$^7$ ........................... B32B 15/00; B32B 15/18; G11B 11/00; G11B 11/10
(52) U.S. Cl. ................ 428/64.3; 428/332; 428/694 ML; 428/694 LE; 428/694 SC; 428/694 DE; 369/13; 369/272; 369/288
(58) Field of Search ............................ 369/13, 272, 288; 428/694 ML, 694 SC, 694 LE, 694 DE, 694 MT, 694 RE, 694 RL, 332, 213, 64.3, 65.3; 420/117, 121, 441, 455, 580, 581; 252/62.51

(56) References Cited

U.S. PATENT DOCUMENTS

| 4,693,943 | * | 9/1987 | Kishi et al. .......................... 428/678 |
| 4,710,431 | * | 12/1987 | Van Engeleu et al. .............. 428/457 |
| 4,814,238 | * | 3/1989 | Tanaka et al. ....................... 428/692 |
| 4,838,962 | * | 6/1989 | Takayama ............................ 148/304 |
| 4,880,694 | * | 11/1989 | Takayama et al. ................... 428/336 |
| 4,992,095 | * | 2/1991 | Nate et al. ............................. 75/246 |
| 5,370,945 | * | 12/1994 | Osato ................................... 428/635 |
| 5,449,566 | * | 9/1995 | Fujii et al. ...................... 428/694 EC |
| 5,529,854 | * | 6/1996 | Shimoda ........................ 428/694 ML |
| 5,612,145 | * | 3/1997 | Segawa et al. .................. 428/694 T |
| 5,660,929 | * | 8/1997 | Suzuki et al. ........................ 428/332 |
| 5,667,887 | * | 9/1997 | Miyazawa et al. .................. 428/332 |

FOREIGN PATENT DOCUMENTS

| 0 168 046 A1 | 1/1986 | (EP) . |
| 0 289 031 A2 | 11/1988 | (EP) . |
| 0 319 636 A1 | 6/1989 | (EP) . |

(List continued on next page.)

*Primary Examiner*—Deborah Jones
*Assistant Examiner*—Michael LaVilla
(74) *Attorney, Agent, or Firm*—Burns, Doane, Swecker & Mathis, L.L.P.

(57) ABSTRACT

An amorphous alloy of light rare earth-transition metal and semi-metal, having a perpendicular magnetic anisotropy without decrease of magnetic moment of light rare earth metal in a short wavelength region, a magneto-optical recording layer made of the amorphous alloy, and a magneto-optical disk adopting the magneto-optical recording layer are provided. According to the magneto-optical recording layer, the semi-metal is added to the amorphous alloy of the light rare earth-transition metal to induce p-d electron orbit coupling between the transition metal and the added semi-metal of the amorphous alloy, thereby decreasing the demagnetizing energy of the amorphous alloy according to the decrease of a magnetic moment of the transition metal, without any effect on the magnetic moment of the light rare earth metal. Therefore, the magneto-optical disk can attain magnetic anisotropy in the growth direction in a short wavelength region and a large Kerr rotation angle can be maintained as a magneto-optical recording medium having the excellent magneto-optical characteristics.

8 Claims, 4 Drawing Sheets

FOREIGN PATENT DOCUMENTS

| | | |
|---|---|---|
| 0 364 631 A1 | 4/1990 | (EP) . |
| 0 368 194 A2 | 5/1990 | (EP) . |
| 0 406 569 A2 | 1/1991 | (EP) . |
| 0 423 418 A2 | 4/1991 | (EP) . |
| 0 476 465 A1 | 3/1992 | (EP) . |
| 0 490 227 A2 | 6/1992 | (EP) . |
| 2 147 751 A | 5/1985 | (GB) . |
| 60-128606 * | 7/1985 | (JP) . |
| 62 226450 * | 10/1987 | (JP) . |
| 62 239447 | 10/1987 | (JP) . |
| 62-246159 | 10/1987 | (JP) . |
| 62-262245 | 11/1987 | (JP) . |
| 63 034753 | 2/1988 | (JP) . |
| 63-34753 | 2/1988 | (JP) . |
| 63 034754 * | 2/1988 | (JP) . |
| 63-140058 * | 6/1988 | (JP) . |
| 63 308750 | 12/1988 | (JP) . |
| 63-308750 | 12/1988 | (JP) . |
| 63-311643 | 12/1988 | (JP) . |
| 2-118066 | 5/1990 | (JP) . |
| 4-245043 | 9/1992 | (JP) . |

* cited by examiner

AMORPHOUS ALLOY OF LIGHT RARE EARTH-TRANSITION METAL AND SEMI-METAL, MAGNETO-OPTICAL RECORDING LAYER MADE OF THE ALLOY, AND MAGNETO-OPTICAL DISK ADOPTING THE LAYER

BACKGROUND OF THE INVENTION

The present invention relates to a perpendicular magnetic anisotropy alloy, a magneto-optical recording layer made of the alloy and a magneto-optical disk adopting the layer, and more particularly, to an amorphous alloy of light rare earth-transition metal and a semi-metal (metalloid), a magneto-optical recording layer made of the amorphous alloy, which exhibits excellent magneto-optical characteristics in a short wavelength range, and a magneto-optical disk adopting the layer.

A magneto-optical disk has high storage density compared to a conventional magnetic disk, and random access characteristics for facilitated searches. Thus, the magneto-optical disk is looked to as a high density recording medium which can replace the hard disk and the magnetic tape.

In a conventional method, the recording layer of the magneto-optical disk is manufactured by depositing a binary alloy of heavy rare earth-transition metal (HRE-TM) having a perpendicular magnetic easy axis with respect to the surface of the recording layer by using a sputtering or vapor deposition method.

When terbium iron (TbFe) or terbium cobalt (TbCo) is used as the binary RE-TM alloy, a strong coercive force and enough magneto-optical effects can be attained. However, corrosion resistance is low.

To overcome the above problems, an alloy of the above binary alloy and another metal has been used as the material for the magneto-optical recording layer, which will be described in detail with reference to FIG. 1.

A ternary amorphous alloy of terbium iron cobalt (TbFeCo), which is excellent in the stability of information storage. However, it is suitable only for long wavelength laser beams (700~1,000 nm). Thus, when the amorphous TbFeCo alloy is used in the short wavelength region of 400 nm for improving the magneto-optical recording density, Kerr rotation angle is decreased at the short wavelength region due to the transition of the electron of heavy rare earth metal Tb at a low energy level (i.e., long wavelength), from 4f to 5d, as shown in FIG. 1, thereby reducing the Kerr rotation angle. The decrease of the Kerr rotation angle lowers a carrier-to-noise ratio (CNR) which represents reproducing characteristics of the magneto-optical recording media. Thus, the amorphous alloy of TbFeCo is not desirable as the material for the recording layer of the recording medium in short wavelengths for high density recording.

To solve the above problems, an alloy of light rare earth-transition metal (LRE-TM) of neodymium iron cobalt (NdFeCo) which increases the Kerr rotation angle in the short wavelength region as shown in FIG. 1 has attracted attention as the material for the recording layer of a magneto-optical recording medium in short wavelengths. However, since the alloy of NdFeCo is ferro-magnetically coupled, the demagnetizing energy is high. Thus, the alloy of NdFeCo does not have perpendicular magnetic anisotropy to the surface of a recording layer, so that the alloy cannot be used as material for the recording layer of the magneto-optical recording medium in short wavelengths.

To solve the above problem, the light rare earth metal has been partially substituted with a heavy rare earth metal. That is, an amorphous alloy of neodymium terbium iron cobalt (NdTbFeCo) has been developed in which the ferromagnetic coupling is partially substituted by a ferrimagnetic coupling to decrease the demagnetizing energy, so that perpendicular magnetic anisotropy to the surface of a recording layer can be induced. However, in the case of the alloy of NdTbFeCo, the Kerr rotation angle is reduced in the short wavelength region as much as the magnetic moment of the light rare earth metal substituted by the heavy rare earth metal, as shown in FIG. 1.

SUMMARY OF THE INVENTION

To solve the above problems, it is an object of the present invention to provide an alloy which can attain perpendicular magnetic anisotropy to the surface of a recording layer without decrease of magnetic moment of light rare earth metal, a magneto-optical recording layer for a high density magneto-optical recording, and a magneto-optical disk adopting the recording layer.

To achieve the above object, there is provided an amorphous alloy of light rare earth-transition metal and semi-metal, which can attain perpendicular magnetic anisotropy in a short wavelength region without decrease of magnetic moment, wherein light rare earth metal is at least one selected from the group consisting of cerium (Ce), praseodymium (Pr), neodymium (Nd), promethium (Pm), samarium (Sm), europium (Eu) and gadolinium (Gd), transition metal is at least one selected from the group consisting of iron (Fe), nickel (Ni) and cobalt (Co), and semi-metal is at least one selected from the group consisting of boron (B), silicon (Si) and phosphorus (P).

In the above amorphous alloy, preferably, the content of the light rare earth metal is 20~30 atomic %, that of the transition metal is 65~79.5 at. %, and that of the semi-metal is 0.5~5 at. %.

To achieve the above object, the magneto-optical recording layer is formed of the amorphous alloy.

The magneto-optical disk of the present invention includes the magneto-optical recording layer made of the amorphous alloy of the light rare earth-transition metal and the semi-metal.

According to one aspect of the present invention, the magneto-optical recording layer has a magnetic anisotropy energy in the range of about −3.5 to about $4.5 \times 10^6$ ergs/cm$^3$, a Kerr rotation angle in the range of about 0.05 to about 1.6 degrees at about 400 nm, and a Curie temperature in the range of about 160° C. to about 190° C.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
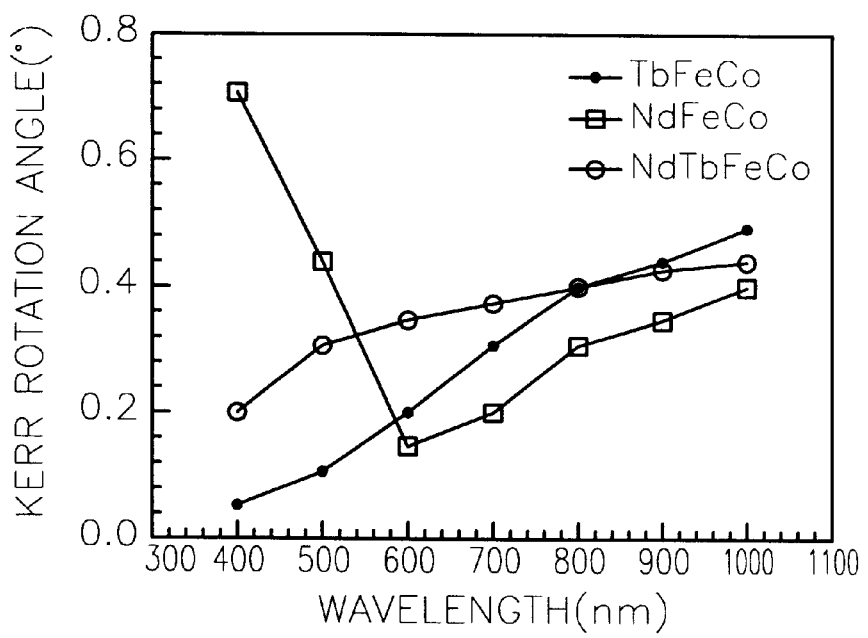
FIG. 1 is a graph showing the Kerr rotation angles of amorphous alloys of TbFeCo, NdFeCo and NdTbFeCo, which are used as the material for a conventional magneto-optical recording layer, according to the wavelengths, wherein the Kerr rotation angle of the TbFeCo alloy is a saturation value measured in in-plane direction.

According to the present invention, an amorphous alloy of light rare earth-transition metal and semi-metal, and a magneto-optical recording layer formed of the amorphous alloy, and a magneto-optical disk including the magneto-optical recording layer are provided.

The magneto-optical disk according to a preferred embodiment of the present invention includes a reflection preventing layer made of dielectric material, formed on a substrate, a magneto-optical recording layer formed on the reflection preventing layer, which is made of an amorphous alloy of light rare earth-transition metal and semi-metal, a protection layer formed on the magneto-optical recording layer, for protecting the magneto-optical recording layer, and a reflection layer formed on the protection layer.

Preferably, light rare earth metal is at least one selected from the group consisting of cerium (Ce), praseodymium (Pr), neodymium (Nd), promethium (Pm), samarium (Sm), europium (Eu) and gadolinium (Gd), transition metal is at least one selected from the group consisting of iron (Fe), nickel (Ni) and cobalt (Co), and semi-metal is at least one selected from the group consisting of boron (B), silicon (Si) and phosphorus (P).

Also, in the above amorphous alloy, preferably, the content of the light rare earth metal is 20~30 at. %, and that of the transition metal is 65~79.5 at. %.

Preferably, in the amorphous alloy of light rare earth-transition metal and semi-metal as material of the magneto-optical recording layer of the present invention, the content of the semi-metal is preferably 0.5~5 at. % with respect to the alloy, particularly, about 2.5~5 at. % of boron (B), preferably, 3 at. %, about 1.5~5 at. % of silicon (Si), preferably, 2 at. % and about 0.5~5 at. % of phosphorous (P), preferably, 1 at. %, as the semi-metal.

As a dielectric material of the reflection preventing layer, SiN is preferably used, however, $Si_3N_4$, SiO or $SiO_2$ may be used as well.

As a material of the protection layer, SiN is preferably used, however, $Si_3N_4$, SiO or $SiO_2$ may be used as well.

Also, as a material of the reflection layer, aluminum (Al) alloy or gold (Au) alloy is used.

Preferably, the thickness of the magneto-optical recording layer is 10 Å~1 μm. That is, when the thickness of the magneto-optical recording layer is below 1 μm, perpendicular magnetic anisotropy is maintained in a desirable level.

The operational principle of a magneto-optical recording layer having the above characteristics will be described.

When an amorphous alloy is fabricated by adding a semi-metal to an amorphous alloy of light rare earth-transition metal, free electrons emitted from p orbit of the semi-metal shift to d orbit of the transition metal which is not fully filled, p-d electron orbit coupling between the semi-metal and the transition metal is induced, which decreases the magnitude of the saturation magnetization. As a result, the demagnetizing energy is decreased to induce a magnetic anisotropy. At this time, the Kerr rotation angle is not affected since the semi-metal does not affect unfilled 4f orbit which determines the magnetic moment of the light rare earth metal. Thus, the amorphous alloy of the light rare earth-transition metal and semi-metal is excellent as the material for the recording layer of the magneto-optical recording medium in a short wavelength range.

Figure 2:
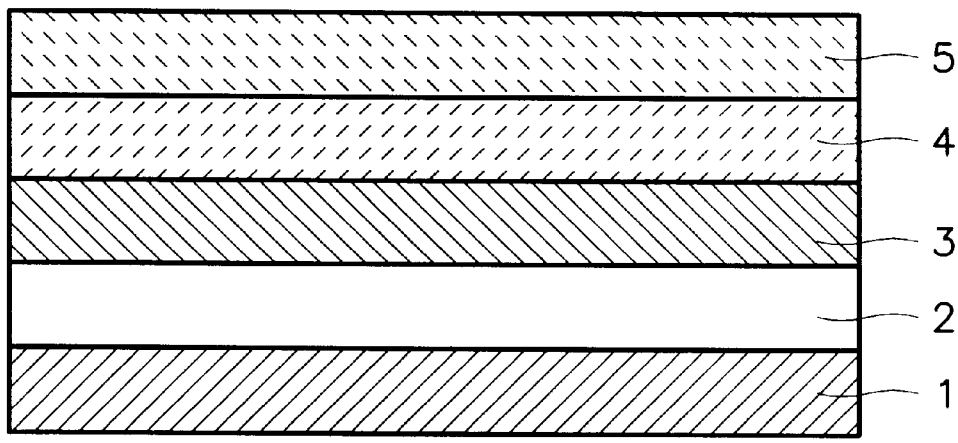
FIG. 2 is a schematic cross-sectional view of a magneto-optical disk according to a preferred embodiment of the present invention.

FIG. 2 is a schematic cross-sectional view of a magneto-optical disk for a short wavelength according to a preferred embodiment of the present invention.

In FIG. 2, a reflection preventing layer 2 made of dielectric material such as silicon nitride (SiN), which prevents reflection, is formed on a transparent substrate 1, and a magneto-optical recording layer 3, which characterizes the present invention, is formed on the reflection preventing layer 2. Here, the thickness of the magneto-optical recording layer 3 should be below 1 μm. Also, a protection layer 4 made of a dielectric material such as silicon nitride (SiN) and a reflection layer 5 are stacked on the magneto-optical recording layer 3 in sequence.

In order to investigate the characteristics of the alloy of the light rare earth-transition metal and semi-metal, and of the magneto-optical disk adopting the magneto-optical recording layer as a recording medium, first the alloy is fabricated, and then the magneto-optical recording layer using the alloy and the magneto-optical disk adopting the recording layer are fabricated.

For manufacturing the magneto-optical disk, first, an alloy target for forming an amorphous magneto-optical recording layer is prepared by adding an amorphous alloy of light rare earth-transition metal to a semi-metal. Then, the obtained alloy is sputtered on the transparent substrate on which a SiN layer as a reflection preventing layer is formed. Here, a physical vapor deposition (PVD) or chemical vapor deposition (CVD) method may be used instead of the sputtering method. Also, $Si_3N_4$, SiO or $SiO_2$ may be used instead of SiN. Subsequently, SiN is again deposited on the amorphous magneto-optical recording layer to form the protection layer, and an aluminum (Al) reflection layer is then stacked on the resultant. Here, as a material of the protection layer, $Si_3N_4$, SiO or $SiO_2$ may be used instead of SiN, and Al alloy or Au alloy may be used as a material of the reflection layer.

FIGS. 3 through 8 are graphs showing the characteristics of the alloy for forming the magneto-optical recording layer of the present invention, the magneto-optical recording layer, and the magneto-optical disk, wherein an alloy of neodymium iron cobalt boron (NdFeCoB) as the amorphous alloy of the amorphous light rare earth-transition metal and semi-metal was used to form the magneto-optical recording layer.

Figure 3:
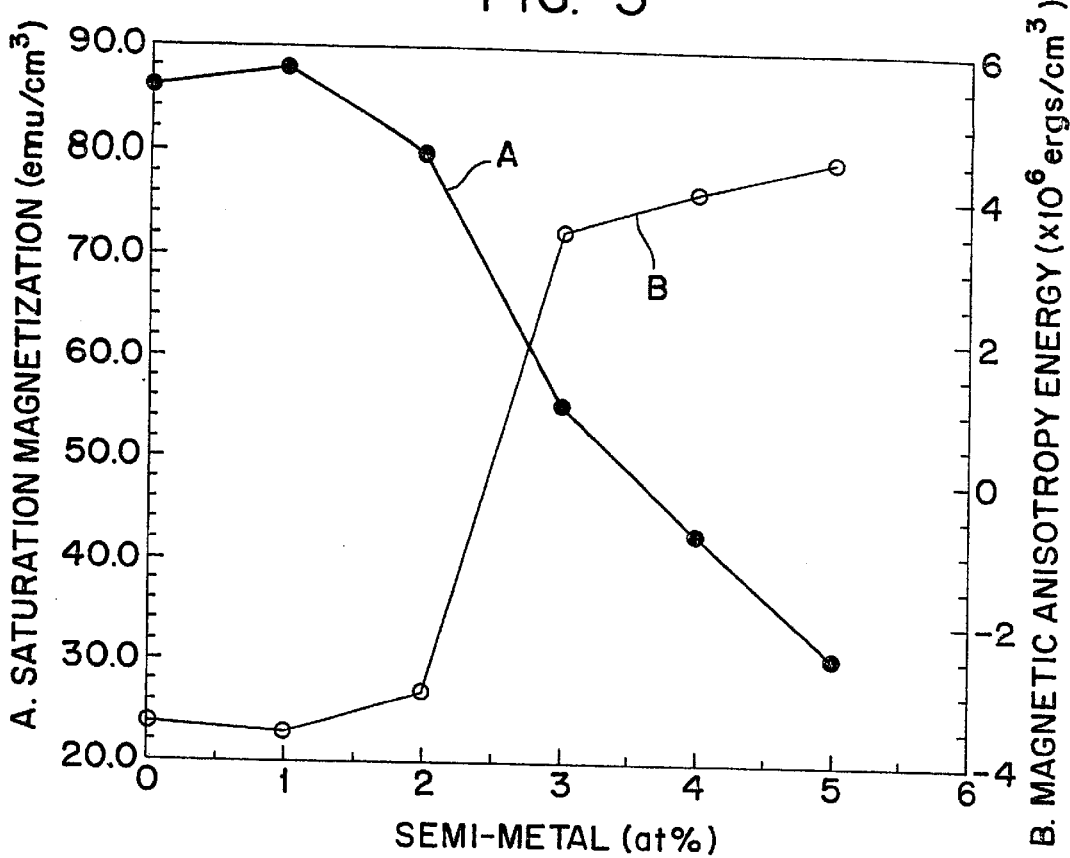
FIG. 3 is a graph showing the saturation magnetization and the perpendicular magnetic anisotropic energy of an alloy used for forming the magneto-optical recording layer of the present invention, according to the content of semi-metal added to the amorphous alloy of light rare earth-transition metal.

FIG. 3 is a graph showing the saturation magnetization (line A) and the perpendicular magnetic anisotropic energy (line B) according to the content of semi-metal added to the amorphous alloy of light rare earth-transition metal.

When the content of semi-metal with respect to the alloy for forming the magneto-optical recording layer is 2~3 at. %, the saturation magnetization of the alloy is sharply decreased. The decrease in saturation magnetization induces a decrease in the demagnetizing energy. As a result, the perpendicular magnetic anisotropy is induced in the amorphous alloy of the light rare earth-transition metal to which the semi-metal is added.

As above, since free electron emitted from the semi-metal added to the alloy of light rare earth-transition metal can not couple with 4f orbit determining a magnetic moment due to a protection function by 5s and 5p orbits which are outer orbits of 4f orbit, it can couple with only 3d orbit of the transition metal without an outer protection orbit, the magnetic moment of the whole alloy is decreased and then demagnetizing energy of the alloy is also decreased. As a result, the alloy of the present invention comes to have perpendicular magnetic anisotropy, providing an excellent optical magnetic effect at the short wavelength region.

Figure 4:
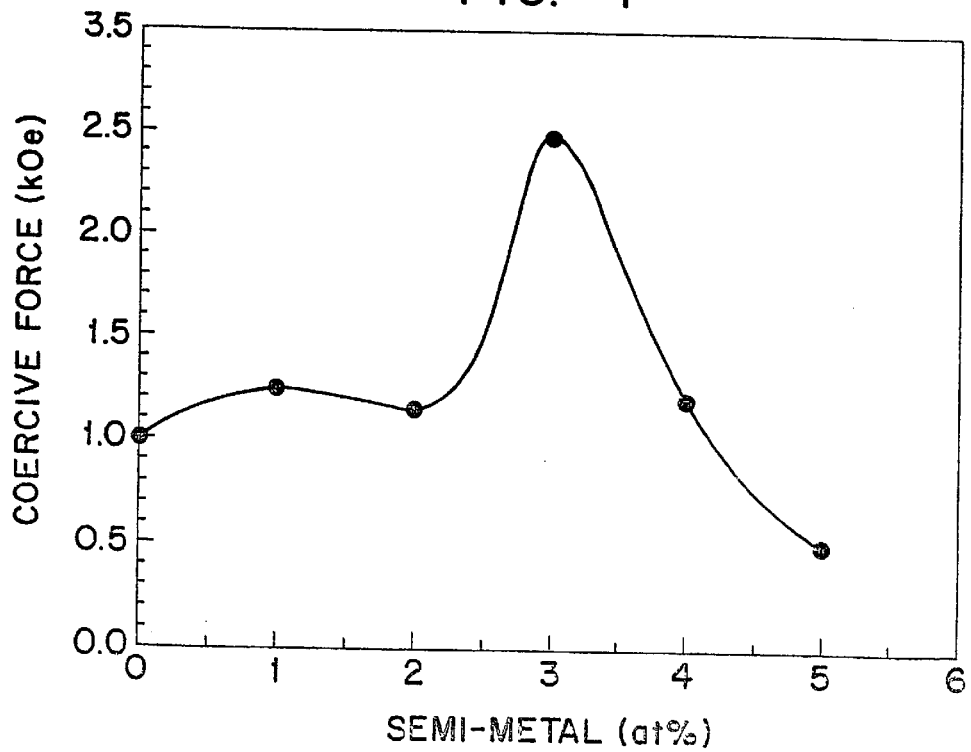
FIG. 4 is a graph showing the coercive force of the alloy used for forming the magneto-optical recording layer of the present invention, according to the content of semi-metal added to the amorphous alloy of the light rare earth-transition metal.

FIG. 4 is a graph showing the coercive force of the alloy used for forming the magneto-optical recording layer according to the content of semi-metal added to the amorphous alloy of the light rare earth-transition metal. When the content of semi-metal with respect to the alloy for forming the magneto-optical recording layer is 2~4 at. %, preferably, about 3 at. %, the coercive force of the alloy is high. This is because the elastic energy of the amorphous alloy increases by the p-d electron orbit coupling. This increased coercive force is sufficient for stable storage of information, so that the amorphous alloy of the light rare earth-transition metal can be used as the material for the recording layer of a recording medium in a short wavelengths.

Figure 5:
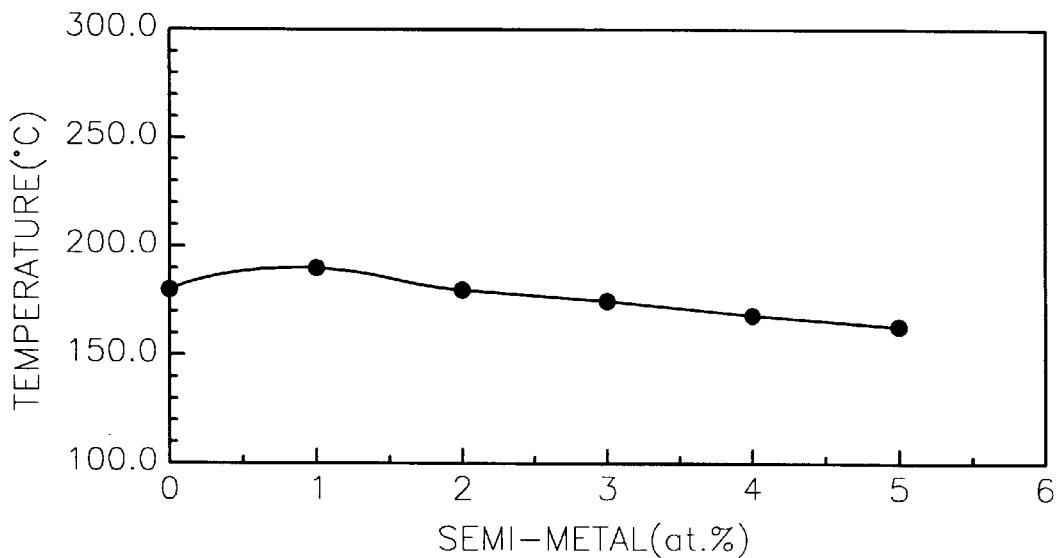
FIG. 5 is a graph showing the Curie temperature of the alloy used for forming the magneto-optical recording layer of the present invention according to the content of semi-metal added to the amorphous alloy of the light rare earth-transition metal.

FIG. 5 is a graph showing the Curie temperature of the alloy used for forming the magneto-optical recording layer according to the content of semi-metal added to the amorphous alloy of the light rare earth-transition metal. As shown in FIG. 5, when the content of semi-metal with respect to the alloy for forming the magneto-optical recording layer is 2~5 at. %, the Curie temperature of the alloy is not changed severely. That is, the Curie temperature is maintained in a proper range, near 180° C., for the magneto-optical recording.

Figure 6:
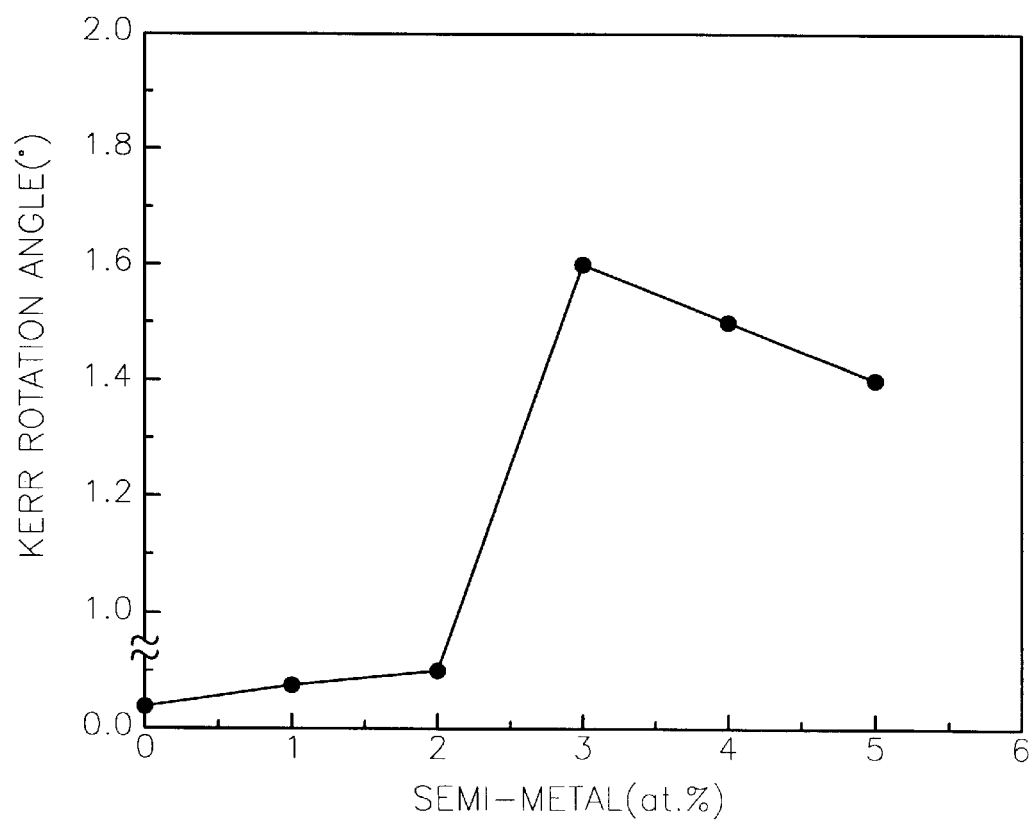
FIG. 6 is a graph showing the Kerr rotation angle in a short wavelength region according to the content of semi-metal added to the amorphous alloy of the light rare earth-transition metal in the magneto-optical disk shown in FIG. 2.

FIG. 6 is a graph showing the Kerr rotation angle in a short wavelength region (400 nm) of a magneto-optical disk of the present invention, according to the content of semi-metal added to the amorphous alloy of the light rare earth-transition metal. When the content of the semi-metal with respect to the alloy for forming the magneto-optical recording layer is 2~3 at. %, the Kerr rotation angle greatly increases. Also, when the content of the semi-metal is 2~5 at. %, the Kerr rotation angle remains in a range of 1.4~1.60° which is suitable for the magneto-optical recording in the short wavelength. This is because the added semi-metal reacts on the transition metal without any effect on the light rare earth metal. That is, the short wavelength laser beam of 400 nm is irradiated on the magneto-optical recording layer of the disk to shift the electrons of light rare earth metal from the 4f orbit to the 5d orbit, so that the magneto-optical energy is emitted with high energy, resulting large Kerr rotation angle at the short wavelength region.

Figure 7:
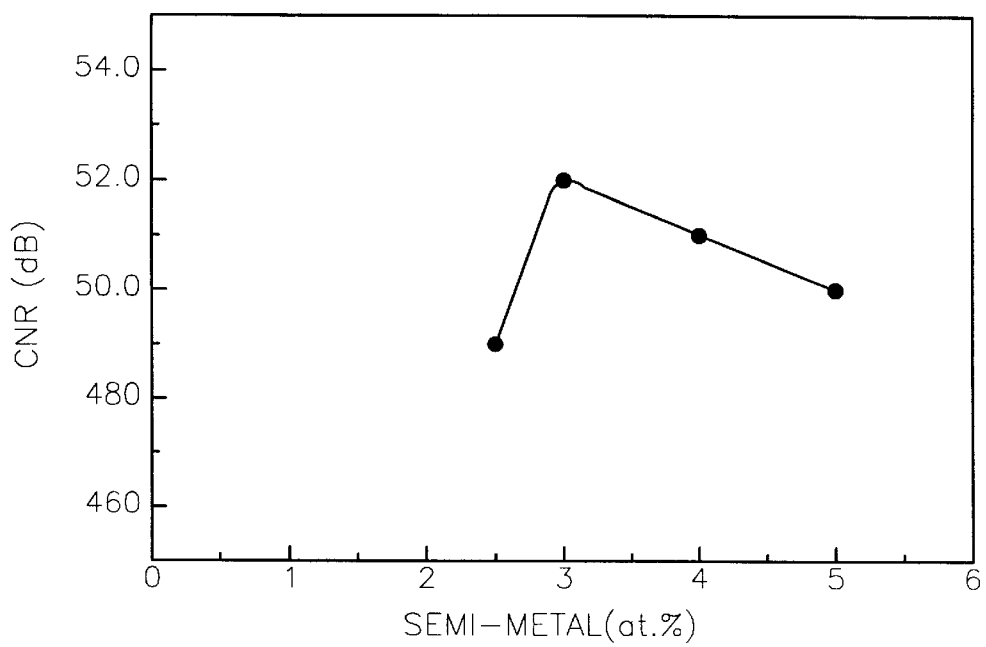
FIG. 7 is a graph showing the carrier-to-noise ratio (CNR) according to the content of semi-metal added to the amorphous alloy of the light rare earth-transition metal in the magneto-optical disk of the present invention.

FIG. 7 is a graph showing the carrier-to-noise ratio (CNR) of the magneto-optical disk of the present invention in the short wavelength region (400 nm), according to the content of semi-metal added to the amorphous alloy of the light rare earth-transition metal, wherein the CNR represents a reproducing characteristic. As shown in FIG. 7, the content of the semi-metal with respect to the alloy for forming the magneto-optical recording layer was increased up to 5 at. %, however, the CNR remains in the level of about 50 dB. Here, the CNR remains at a high level, thus the magneto-optical disk of the present invention can be used as a high density magneto-optical recording medium.

Figure 8:
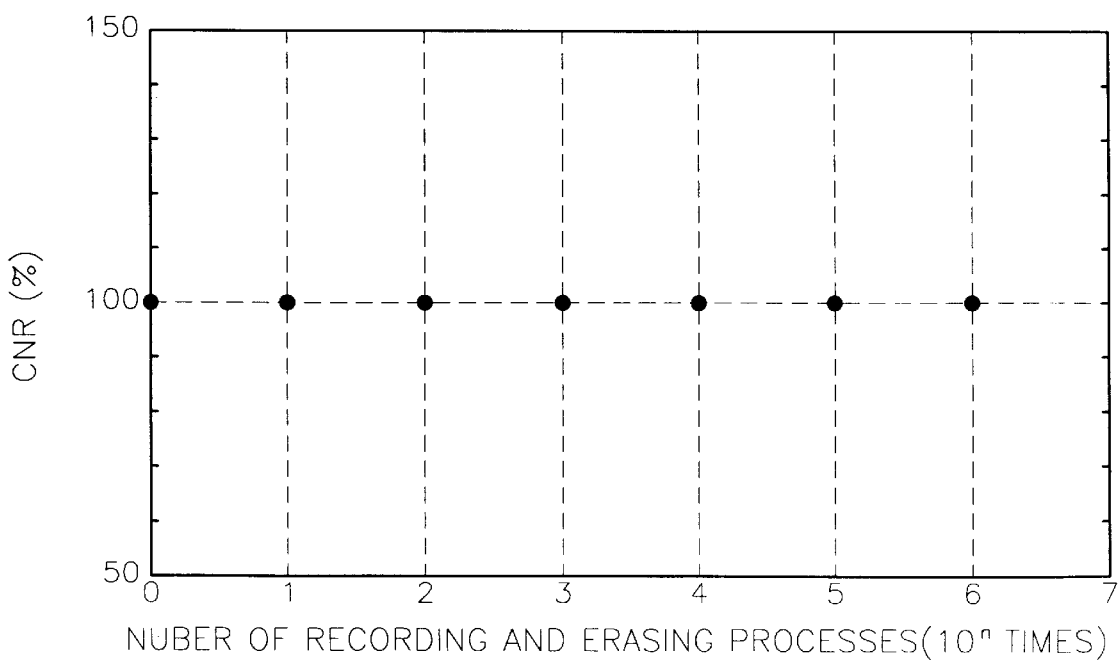
FIG. 8 is a graph showing the relative CNR according to the number of recording and erasing processes in the magneto-optical disk of the present invention.

FIG. 8 is a graph showing the CNR of the magneto-optical disk of the present invention according to the number of recording and erasing processes. As shown in FIG. 8, even after the recording and erasing processes are repeated to $10^6$ times, the CNR does not decrease. That is, this graph shows the reliability and durability of the magneto-optical disk of the present invention as a magneto-optical recording medium.

When the experiment of the above embodiment is repeated using Si and P instead of B as the semi-metal, excellent result was also obtained. That is, the result is preferable at about 1.5~5 at. % of Si, particularly, about 2 at. %, and about 0.5%~5 at. % of P, particularly, about 1 at. %. At the above levels, the perpendicular magnetic anisotropy is induced from the amorphous alloy of the light rare earth-transition metal and semi-metal, so that the amorphous alloy can preferably be used as materials for the magneto-optical recording layer for a short wavelength, and for the magneto-optical disk adopting the recording layer.

As described above, according to the magneto-optical recording layer of the present invention, semi-metal is added to the amorphous alloy of the light rare earth-transition metal to induce the p-d electron orbit coupling between the transition metal of the amorphous alloy and the added semi-metal, thereby decreasing the demagnetizing energy of the amorphous alloy without any effect on the magnetic moment of the light rare earth metal. Thus, the magneto-optical disk of the present invention can attain perpendicular magnetic anisotropy to a recording layer in the short wavelength region and the large Kerr rotation angle can be maintained for used as a magneto-optical recording medium having excellent magneto-optical characteristics.

While the present invention has been illustrated and described with reference to specific embodiment, this invention is not limited to the particular forms illustrated and further modifications and alterations will occur to those skilled in the art within the spirit and scope of this invention.

What is claimed is:

1. A magneto-optical recording layer for short wavelengths of about 400 nm, said magneto-optical recording layer comprising an amorphous alloy of 20 to 30 atomic % of at least one light rare earth metal comprising Nd, at least two transition metals comprising Fe and Co, and a semi-metal comprising 0.5 to 5 atomic % B with respect to said alloy, and wherein said magneto-optical recording layer has a magnetic anisotropy energy in the range of about −3.5 to about $4.5 \times 10^6$ ergs/cm$^3$, a Kerr rotation angle in the range of about 0.05 to about 1.6 degrees at about 400 nm, and a Curie temperature in the range of about 160° C. to about 190° C.

2. A magneto-optical disk for short wavelengths of about 400 nm, comprising a magneto-optical recording layer which includes an amorphous alloy of 20 to 30 atomic % of at least one light rare earth metal comprising Nd, at least two transition metals comprising Fe and Co and a semi-metal comprising 0.5 to 5 atomic % B with respect to said alloy, and wherein said magneto-optical recording layer has a magnetic anisotropy energy in the range of about −3.5 to about $4.5 \times 10^6$ ergs/cm³, a Kerr rotation angle in the range of about 0.05 to about 1.6 degrees at about 400 nm, and a Curie temperature in the range of about 160° C. to about 190° C.

3. A magneto-optical disk for short wavelengths of about 400 nm, comprising:
   a substrate;
   a reflection preventing layer made of dielectric material on the substrate;
   a magneto-optical recording layer on said reflection preventing layer which includes an amorphous alloy of 20 to 30 atomic % of at least one light rare earth metal comprising Nd, at least two transition metals comprising Fe and Co and a semi-metal comprising 0.5 to 5 atomic % B with respect to said alloy, and wherein said magneto-optical recording layer has a magnetic anisotropy energy in the range of about −3.5 to about 4.5×106 ergs/cm³, a Kerr rotation angle in the range of about 0.05 to about 1.6 degrees at about 400 nm, and a Curie temperature in the range of about 160° C. to about 190° C.;
   a protection layer on said magneto-optical recording layer, for protecting said magneto-optical recording layer; and
   a reflection layer on said protection layer.

4. A magneto-optical disk as claimed in claim 3, wherein said reflection preventing layer is formed of one dielectric material selected from the group consisting of SiN, $Si_3N_4$, SiO and $SiO_2$.

5. A magneto-optical disk as claimed in claim 3, wherein said protection layer is formed of one dielectric material selected from the group consisting of SiN, $Si_3N_4$, SiO and $SiO_2$.

6. A magneto-optical disk as claimed in claim 3, wherein said reflection layer is formed of one metal alloy selected from the group consisting of aluminum (Al) alloy and gold (Au) alloy.

7. A magneto-optical disk as claimed in claim 3, wherein the thickness of said magneto-optical recording layer is 10 Å~1 µm.

8. A magneto-optical recording layer for short wavelengths of about 400 nm, said magneto-optical recording layer consisting essentially of an amorphous alloy of 20 to 30 atomic % of at least one light rare earth metal comprising Nd, at least two transition metals comprising Fe and Co and a semi-metal comprising 0.5 to 5 atomic % B with respect to said alloy, and wherein said magneto-optical recording layer has a magnetic anisotropy energy in the range of about −3.5 to about $4.5 \times 10^6$ ergs/cm³, a Kerr rotation angle in the range of about 0.05 to about 1.6 degrees at about 400 nm, and a Curie temperature in the range of about 160° C. to about 190° C.

* * * * *